(12) United States Patent
Saitoh

(10) Patent No.: US 8,922,815 B2
(45) Date of Patent: Dec. 30, 2014

(54) COMMUNICATION APPARATUS, COMMUNICATION CONTROL APPARATUS, AND COMMUNICATION SYSTEM

(75) Inventor: Kazutaka Saitoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 371 days.

(21) Appl. No.: 13/556,657

(22) Filed: Jul. 24, 2012

(65) Prior Publication Data
US 2013/0215456 A1     Aug. 22, 2013

(30) Foreign Application Priority Data
Feb. 16, 2012   (JP) .................................. 2012-031549

(51) Int. Cl.
*G06F 3/12* (2006.01)

(52) U.S. Cl.
USPC ............................ 358/1.15; 358/407; 358/442

(58) Field of Classification Search
USPC ............... 358/1.13, 1.15, 501, 401, 405, 407, 358/425, 434, 435, 440, 442; 370/254, 389, 370/392, 395.5, 395.52; 379/88.17, 265.09
See application file for complete search history.

(56) References Cited

FOREIGN PATENT DOCUMENTS

| GB | 2 435 148 A | 8/2007 |
|---|---|---|
| JP | A-2006-81044 | 3/2006 |

*Primary Examiner* — Vu B Hang
(74) *Attorney, Agent, or Firm* — Oliff PLC

(57) ABSTRACT

A communication apparatus includes a storage unit that stores an Internet protocol (IP) address, a call connection unit that connects a call by transmitting a call connection request via a communication control apparatus to a communication apparatus, and by receiving, via the communication control apparatus, session description protocol (SDP) information in response to the call connection request, an IP address retrieval unit that retrieves an IP address included in the received SDP information, an instructing unit that overwrites the IP address stored on the storage unit with the retrieved IP address, and instructs the communication control apparatus to overwrite an IP address stored on the communication control apparatus with the retrieved IP address, and a transmitting unit that transmits facsimile data to the retrieved IP address as a destination address if the facsimile data are to be transmitted to the communication apparatus connected to the public IP network.

10 Claims, 7 Drawing Sheets

COMMUNICATION APPARATUS, COMMUNICATION CONTROL APPARATUS, AND COMMUNICATION SYSTEM

CROSS-REFERENCE TO RELATED APPLICATIONS

This application is based on and claims priority under 35 USC 119 from Japanese Patent Application No. 2012-031549 filed Feb. 16, 2012.

BACKGROUND (i) Technical Field

The present invention relates to a communication apparatus, a communication control apparatus, and a communication system.

(ii) Related Art

Services of facsimile communication using Internet protocol (IP) via an IP network are available. Facsimile communications include Internet facsimile communication performed in accordance with International Telecommunication Union-Telecommunication Standardization Sector (ITU-T) T.37 Standard and IP facsimile communication performed in accordance with ITU-T T.38 Standard.

SUMMARY

According to an aspect of the invention, a communication apparatus is provided. The communication apparatus includes a first storage unit that stores an Internet protocol (IP) address, a call connection unit that connects a call by transmitting a call connection request, via a communication control apparatus connected to a public IP network and selecting the public IP network to transmit incoming data to the public IP network, to a communication apparatus having an IP address and connected to the public IP network, and by receiving, via the communication control apparatus, session description protocol (SDP) information as response information, including IP address information, transmitted in response to the call connection request, an IP address retrieval unit that retrieves the IP address included in the response information received by the call connection unit, an instructing unit that, if the IP address retrieved by the IP address retrieval unit is different from the IP address stored on the first storage unit, overwrites the IP address stored on the first storage unit with the retrieved IP address, and instructs the communication control apparatus to overwrite an IP address stored on the communication control apparatus with the retrieved IP address, and a transmitting unit that transmits facsimile data, via the communication control apparatus, to the IP address provided as a result of overwriting by the instructing unit as a destination address if the facsimile data are to be transmitted to the communication apparatus connected to the public IP network.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
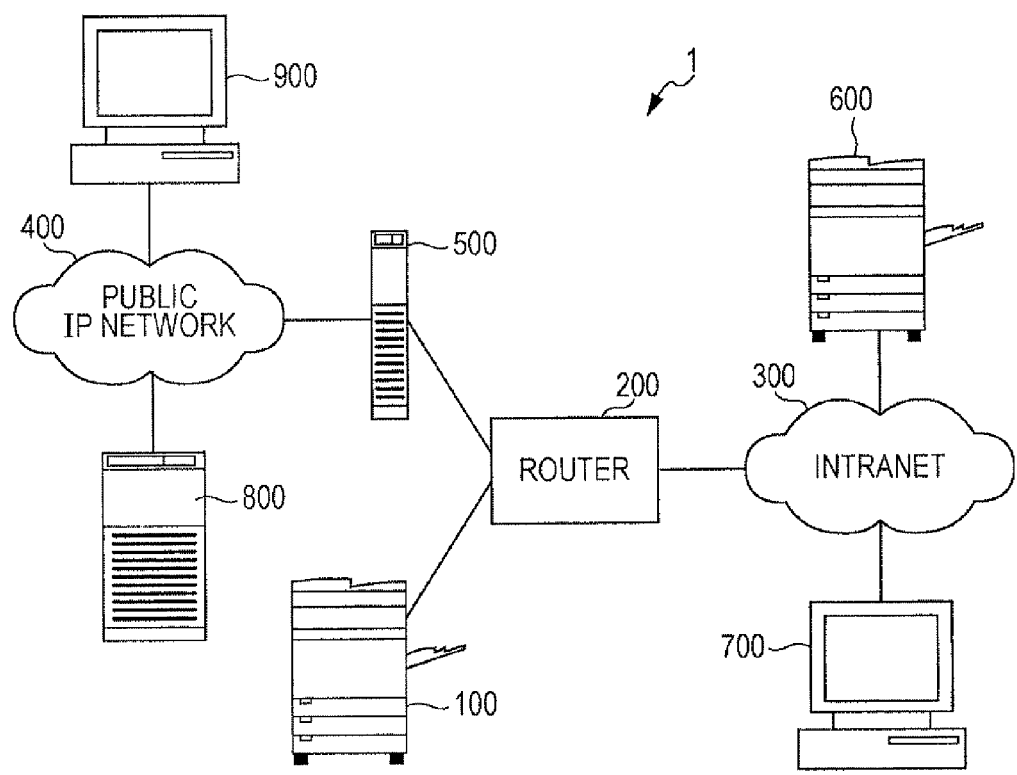
FIG. 1 is a block diagram of a communication system of an exemplary embodiment of the present invention.

FIG. 1 is a block diagram of a communication system 1 of an exemplary embodiment of the present invention. The communication system 1 includes image forming apparatus 100, router 200, intranet 300, public IP network 400, home gateway (HGW) 500, image forming apparatus 600, personal computer (PC) 700, maintenance apparatus 800, and communication apparatus 900. The image forming apparatus 100 is an example of a communication apparatus of the exemplary embodiment of the present invention. The image forming apparatus 100 has an image forming function that forms an image on a recording medium such as a paper sheet in accordance with data transmitted from another computer such as a personal computer, a copying function that copies an image, a scan function that reads an image formed on a recording medium, a facsimile function, and other functions. The image forming apparatus 100 is not necessarily provided with all the functions. For example, the image forming apparatus 100 may have the facsimile function but may not have the other functions. The router 200 is a communication control apparatus that interconnects the intranet 300 and the public IP network 400. The intranet 300 is an example of a first communication network of the exemplary embodiment of the present invention. The intranet 300 may be a local area network (LAN), for example. The public IP network 400 is an example of a second communication network of the exemplary embodiment of the present invention. The public IP network 400 may be a next generation network (NGN), for example. The public IP network 400 is connected to the router 200 via the HGW 500.

The image forming apparatus 600 and the PC 700 are communication apparatuses connected to the intranet 300. The image forming apparatus 600 has the image forming function and the facsimile function. The maintenance apparatus 800 is arranged over the public IP network 400, and performs maintenance and management on the public IP network 400. The communication apparatus 900 is connected to the public IP network 400. The single image forming apparatus 600 and the single PC 700 are illustrated in FIG. 1. Communication apparatuses connected to the intranet 300 are not limited to the image forming apparatus 600 and the PC 700. More communication apparatuses may be connected to the intranet 300. Communication apparatuses in addition to the communication apparatus 900 may be connected to the public IP network 400. For simplicity of the drawings, the communication apparatus 900 only is illustrated.

Figure 2:
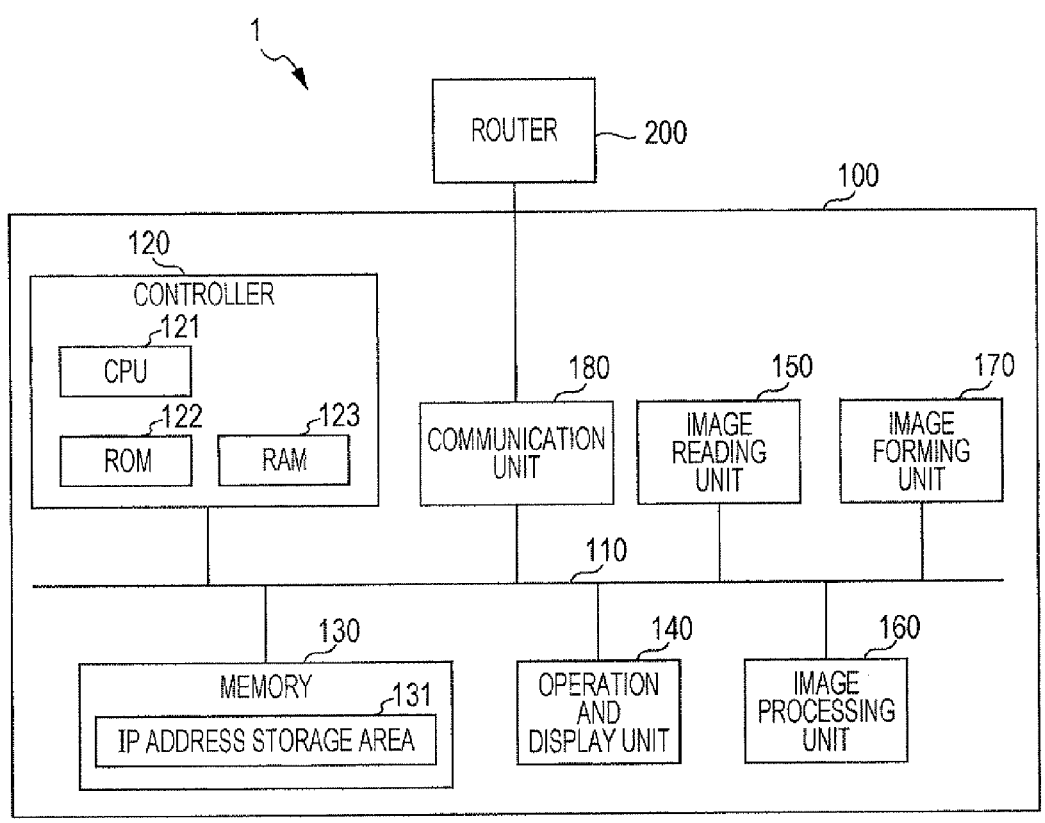
FIG. 2 is a block diagram of an image forming apparatus.

FIG. 2 is a block diagram of a hardware configuration of the image forming apparatus 100. As illustrated in FIG. 2, elements of the image forming apparatus 100 are connected to a bus 110, and exchange data via the bus 110. A controller 120 includes central processing unit (CPU) 121, read-only memory (ROM) 122, and random-access memory (RAM) 123. The controller 120 controls the image forming apparatus 100 in accordance with a computer program stored on one of the ROM 122 and the memory 130. The memory 130 is a storage unit such as a hard disk, and stores a variety of programs including the program related to control of the image forming apparatus 100. The operation and display unit 140 includes a liquid-crystal display functioning as a touchpanel. A user of the image forming apparatus 100 performs a variety of operations by touching the liquid-crystal display. The operation and display unit 140 is an example of an operation unit of the exemplary embodiment of the present invention. A communication unit 180 is a connector for communication. The communication unit 180 is connected to the router 200 via a communication cable, and performs data communication with an apparatus, connected to one of the intranet 300 and the public IP network 400, via the router 200.

An image reading unit 150, including an optical element (not illustrated), optically reads an image of an original document, and thus generates image data representing the read image. An image processing unit 160 performs a variety of image processing operations, including color calibration and color gradation correction, on an image represented by the image data. The image processing unit 160 generates, from the processed image data, image data of yellow (Y), magenta (M), cyan (C), and black (B) images, and performs a screen process on the generated image data, and then outputs the resulting image data to an image forming unit 170. The image processing unit 160 may include an integrated circuit such as an application specific integrated circuit (ASIC). The image forming unit 170 generates toner images of Y, M, C, and K in accordance with the image data of Y, M, C, and K colors, and transfers the toner images onto a recording medium. The image forming unit 170 thus forms an image on the recording medium.

The memory 130 includes an IP address storage area 131. The IP address storage area 131 is an example of a first storage unit of the exemplary embodiment of the present invention. The IP address storage area 131 stores information about a communication apparatus connected to the public IP network 400 and an IP address used in facsimile communication.

Figure 3:
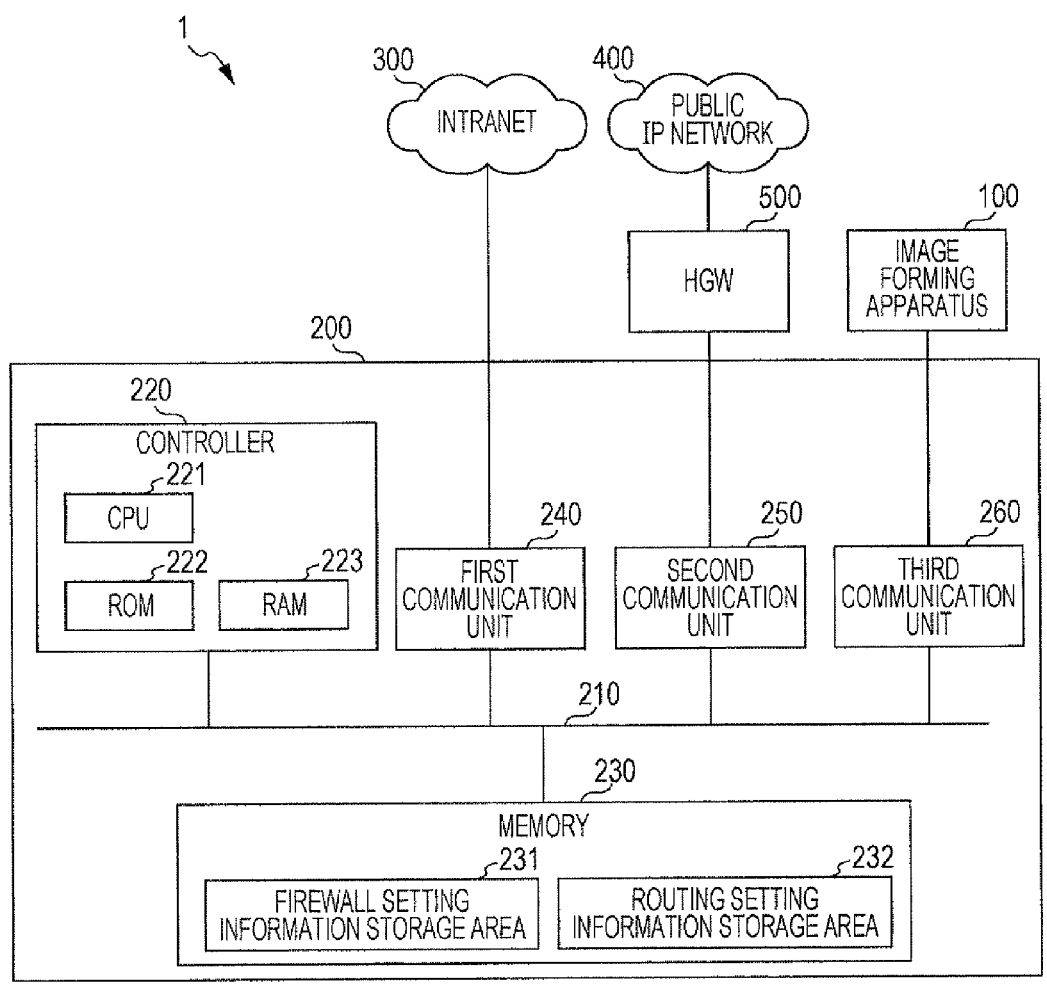
FIG. 3 is a block diagram illustrating a configuration of a router.

FIG. 3 is a block diagram of a hardware configuration of the router 200. Elements of the router 200 are connected to each other via a bus 210, and exchange data via the bus 210. As illustrated in FIG. 3, a controller 220 includes CPU 221, ROM 222, and RAM 223. The controller 220 controls the router 200 in accordance with a computer program stored on one of the ROM 222 and the RAM 223. A memory 230 is a storage unit such as a hard disk, and stores a variety of programs including the program related to control of the router 200.

A first communication unit 240 is connected to the intranet 300 via a communication cable, and exchanges data with an apparatus connected to the intranet 300. A second communication unit 250 is connected to the public IP network 400 via the HGW 500 and a communication cable, and exchanges data with an apparatus connected to the public IP network 400. A third communication unit 260 is connected to the image forming apparatus 100 via a communication cable, and exchanges data with the image forming apparatus 100. The router 200 may be connected to the image forming apparatus 100 via the intranet 300 instead of being directly connected to the image forming apparatus 100.

The memory 230 is an example of a second storage unit of the exemplary embodiment of the present invention, and includes a firewall setting information storage area 231 and a routing setting information storage area 232. The firewall setting information storage area 231 stores firewall setting information indicating an IP address that authorizes access from the public IP network 400 to the intranet 300. The firewall setting information storage area 231 is an example of an access setting information storage unit of the exemplary embodiment of the present invention. The routing setting information storage area 232 stores routing setting information indicating an IP address according to which one of the intranet 300 and the public IP network 400 is selected to route an incoming packet (data) therethrough. The routing setting information is an example of communication network setting information of the exemplary embodiment of the present invention. The routing setting information storage area 232 is an example of a communication network setting information storage unit. In the following discussion, the firewall setting information and the routing setting information are collectively referred to as "setting information."

Figure 4:
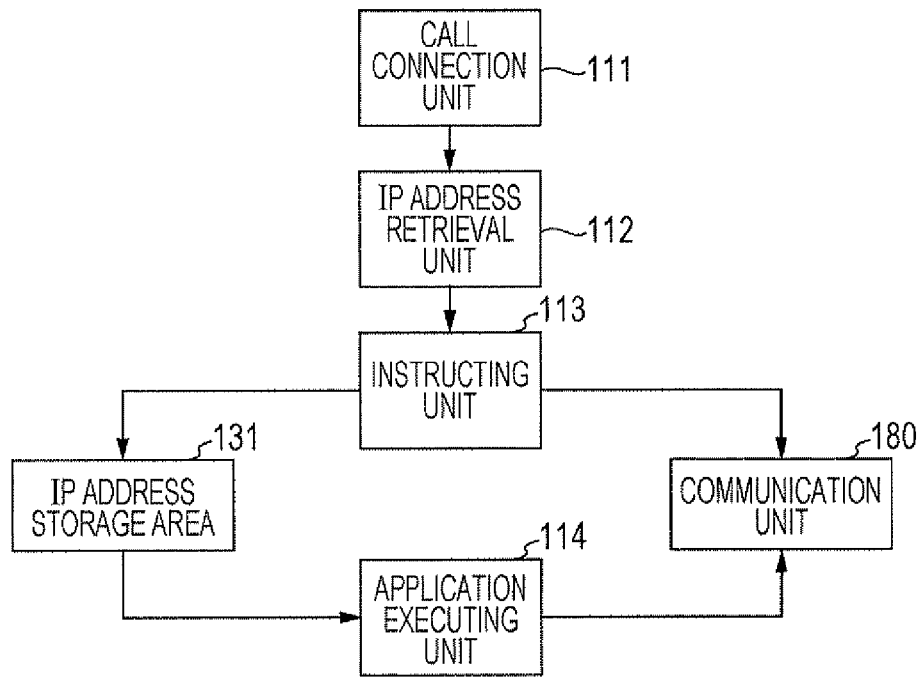
FIG. 4 is a block diagram of a functional configuration of the image forming apparatus.

A functional configuration of the image forming apparatus 100 is described with reference to the drawings. FIG. 4 is a functional block diagram of the image forming apparatus 100. As illustrated in FIG. 4, call connection unit 111, IP address retrieval unit 112, instructing unit 113, and application executing unit 114 are implemented when the controller 120 executes the computer program stored on one of the ROM 122 and the memory 130. Each arrow-headed line in FIG. 4 denotes the direction of data flow. As illustrated in FIG. 4, the call connection unit 111 performs a call connection by transmitting a call connection request to an apparatus connected to the public IP network 400 (second communication network), and by receiving response information transmitted in response to the call connection request. In accordance with the exemplary embodiment, the call connection unit 111 connects a call at one of a startup timing of the image forming apparatus 100, a startup timing of an application that performs a facsimile function, and a timing when a test call connection is instructed by a user operation (a timing when a predetermined signal is output from the operation and display unit 140). In the following discussion, the call connection process performed by the call connection unit 111 is referred to as a "test call connection."

In accordance with the exemplary embodiment, the call connection unit 111 makes a call connection request by transmitting an INVITE request of session initial protocol (SIP) to a maintenance apparatus 800 in order to find a listening IP address of T.38 protocol on the public IP network 400. The INVITE request is a communication request of SIP to start a session, and includes an IP address of the image forming apparatus 100 and a telephone number of the maintenance apparatus 800. The call connection unit 111 sets a media type to be T.38, selects a bandwidth that is rated for a minimum fee for the test call connection (selects 64 kbps, for example), and then makes a call. If a call connection is established, the call connection unit 111 is notified of a response "200 (OK (call connection establishment))" in response to the INVITE request.

The IP address retrieval unit 112 is an example of an IP address retrieval unit that retrieves an IP address included in a response (response information) received by the call connection unit 111. In accordance with the exemplary embodiment, when the call connection unit 111 receives the response (200), the IP address retrieval unit 112 retrieves a listening IP address of the T.38 protocol from session description protocol (SDP) included in the response. The listening IP address is used in the T.38 protocol. In accordance with the exemplary embodiment, an IP address of a predetermined apparatus arranged over the public IP network 400 is used for the listening IP address.

If the IP address retrieved by the IP address retrieval unit 112 is different from the IP address stored on the IP address storage area 131, the instructing unit 113 overwrites the IP address stored on the IP address storage area 131 with the retrieved IP address, and instructs the router 200 to overwrite the IP addresses stored on the firewall setting information storage area 231 and the routing setting information storage area 232 with the retrieved IP address. In accordance with the exemplary embodiment, the instructing unit 113 compares the IP address retrieved from the SDP information with the IP address stored on the IP address storage area 131. If the two IP addresses are different from each other, the instructing unit 113 overwrites the storage contents on the IP address storage area 131 with the retrieved IP address. In order to modify the setting information stored on the memory 230 in the router 200, the instructing unit 113 requests the router 200 to modify the setting, including a modification of the setting to the retrieved IP address.

The application executing unit 114 implements an application that performs the facsimile function, and is an example of a transmitting unit of the exemplary embodiment of the present invention. In order to transmit facsimile data to the public IP network 400, the application executing unit 114 transmits the facsimile data to the IP address stored on the IP address storage area 131 as a destination address.

Figure 5:
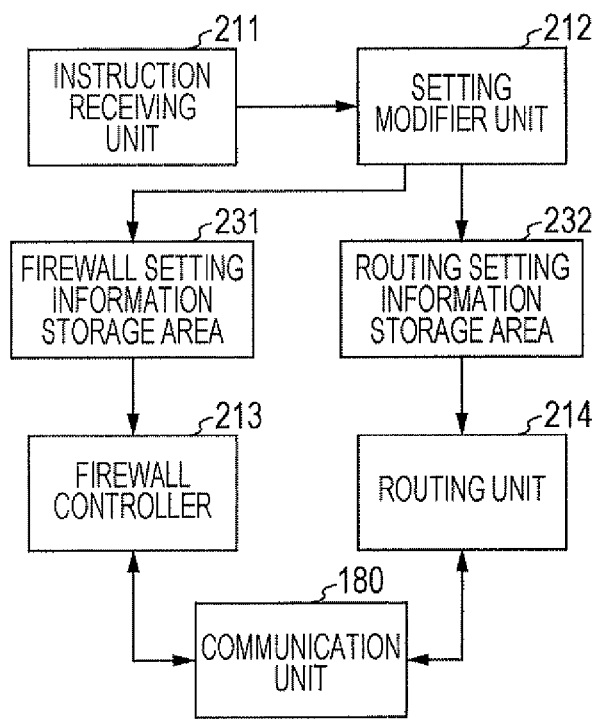
FIG. 5 is a functional block diagram of the router.

FIG. 5 is a functional block diagram of the router 200. As illustrated in FIG. 5, instruction receiving unit 211, setting modifier unit 212, firewall controller 213, and routing unit 214 are implemented when the controller 220 executes the computer program stored on one of the ROM 222 and the memory 230. Each arrow-headed line in FIG. 5 denotes the direction of flow of data. As illustrated in FIG. 5, an instruction receiving unit 211 is an example of a receiving unit that receives from the image forming apparatus 100 an instruction to modify the IP address. In accordance with the exemplary embodiment, the instruction receiving unit 211 receives from the image forming apparatus 100 a request to modify the setting.

In response to the request (instruction) received from the instruction receiving unit 211, the setting modifier unit 212 modifies the firewall setting information stored on the firewall setting information storage area 231 and the routing setting information stored on the routing setting information storage area 232. More specifically, the controller 220 updates the IP address in the firewall setting information that authorizes access from the public IP network 400 to the intranet 300. The controller 220 also updates the IP address according to which one of the intranet 300 and the public IP network 400 is selected to route an incoming packet therethrough.

The firewall controller 213 controls access from the public IP network 400 to the intranet 300 in accordance with the contents of the firewall setting information. The firewall controller 213 is an example of an access controller that authorizes an access to the intranet 300 from the IP address indicated by the firewall setting information stored on the firewall setting information storage area 231.

The routing unit 214 routes an incoming packet to one of the intranet 300 and the public IP network 400. The routing unit 214 routes the incoming packet in accordance with the IP address system. The routing unit 214 also routes to the public IP network 400 the incoming packet if the incoming packet has the IP address indicated by the routing setting information stored on the routing setting information storage area 232. The routing unit 214 routes the other incoming packets to the intranet 300. The routing unit 214 is an example of a data transmitting unit of the exemplary embodiment of the present invention.

First Operation Example

Figure 6:
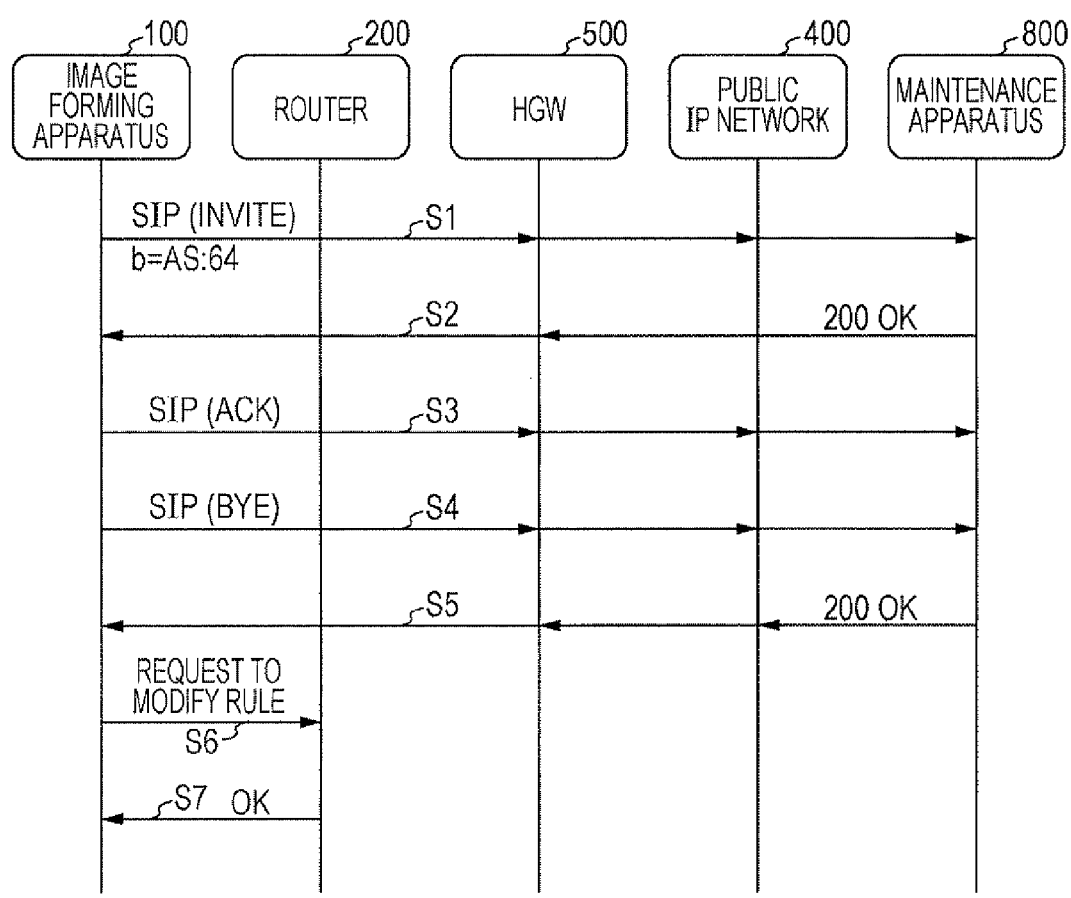
FIG. 6 is a sequence chart illustrating an operation of the communication system.

Operation examples performed by the communication system 1 are described with reference to a sequence chart of FIG. 6. The controller 120 in the image forming apparatus 100 performs a test call connection process of FIG. 6 if the image forming apparatus 100 is started up, if the application performing the facsimile function is started up, or if the operation and display unit 140 indicates in response to a user operation that the test call connection is to be performed (the operation and display unit 140 outputs a predetermined signal). The controller 120 in the image forming apparatus 100 makes a call connection request (transmits an INVITE request) to the maintenance apparatus 800 (S1). The controller 120 sets a media type to be T.38, selects a bandwidth that is rated for a minimum fee for the test call connection (selects 64 kbps, for example), and then makes a call.

If a call connection is established, the controller 120 is notified of a response "200 (OK (call connection establishment))" in response to the INVITE request (S2). The controller 120 retrieves the T.38 listening IP address from the SDP information included in the notified response. Upon being notified of the response (200) in the test call connection process, the controller 120 clears the call without starting the TCP session (S3, S4, and S5).

The controller 120 compares the retrieved IP address with the IP address stored on the IP address storage area 131. If the two IP addresses are different from each other, the controller 120 overwrites the IP address stored on the IP address storage area 131 with the retrieved IP address, and then transmits an instruction (i.e., a setting modification request) to the router 200 (S6). By transmitting the setting modification request, the controller 120 instructs the router 200 to overwrite the IP addresses stored on the firewall setting information storage area 231 and the routing setting information storage area 232 with the retrieved IP address. The setting modification request includes an IP address that authorizes access from the public IP network 400 to the intranet 300, and an IP address according to which one of the intranet 300 and the public IP network 400 is selected to route the incoming packet therethrough. If the retrieved IP address matches the IP address stored on the IP address storage area 131, there is no need to modify the setting. The controller 120 does not transmit the setting modification request.

Upon receiving the setting modification request from the image forming apparatus 100, the controller 220 in the router 200 modifies the firewall setting information and the routing setting information in accordance with the received setting modification request. More specifically, the controller 220 updates the IP address in the firewall setting information that authorizes access from the public IP network 400 to the intranet 300 from the IP address on the router 200 to the IP address included in the received setting modification request. The controller 220 also updates the IP address, according to which one of the intranet 300 and the public IP network 400 is selected as a destination to route the incoming packet therethrough, from the IP address on the router 200 to the IP address included in the received setting modification request. Upon updating the setting information, the controller 220 transmits a response to the setting modification request to the image forming apparatus 100 (S7). The test call connection process has been described.

The controller 220 in the router 200 performs an access control process and a routing process in accordance with the storage contents on the firewall setting information storage area 231 and the routing setting information storage area 232. More specifically, the controller 220 authorizes an access from an IP address specified by the image forming apparatus 100 (the IP address included in the SDP information retrieved at the call connection) to the intranet 300. The controller 220 routes to the public IP network 400 a packet having as a destination IP address the IP address specified by the image forming apparatus 100, while routing the other packets to the intranet 300. The facsimile communication is thus performed via the IP network from the image forming apparatus 100 to the public IP network 400. Communication from the image forming apparatus 100 to the intranet 300 (to use the scan function) is performed in the same process as in the related art. More specifically, when data communication from the image forming apparatus 100 to the intranet 300 is performed, the controller 120 generates a packet using an IP address of an apparatus as a data communication destination, and then transmits the packet to the apparatus.

Second Operation Example

Figure 7:
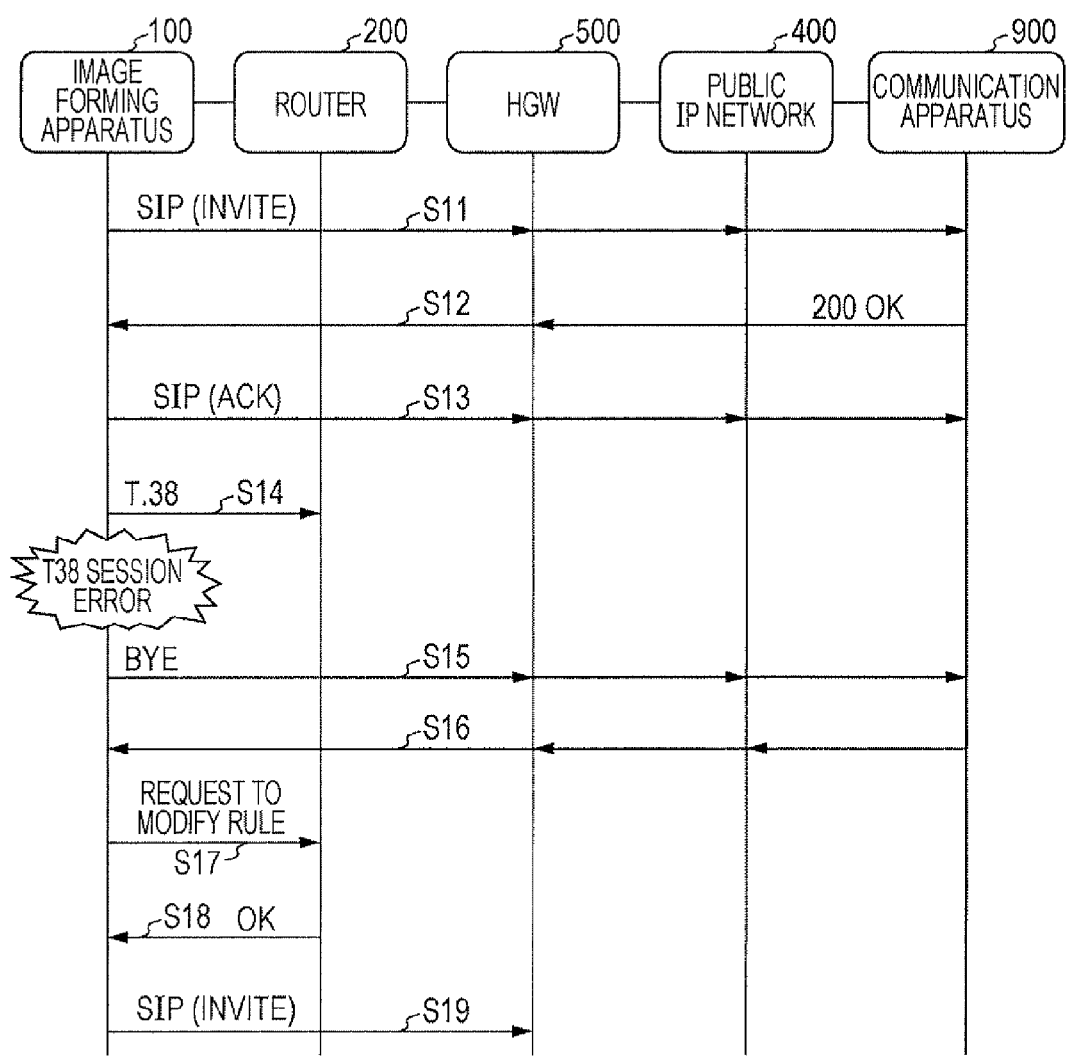
FIG. 7 is a sequence chart illustrating an operation of the communication system.

FIG. 7 is a sequence chart of an operation in which the facsimile data transmission to the public IP network 400 fails. In the operation described with reference to FIG. 7, the image forming apparatus 100 fails to establish a T.38 session when the image forming apparatus 100 attempts to transmit the facsimile data to the communication apparatus 900. The controller 120 in the image forming apparatus 100 establishes the call connection with the communication apparatus 900 as a transmission destination. More specifically, the controller 120 transmits an INVITE request (S11). Upon receiving the INVITE request, the communication apparatus 900 transmits a response (200 (OK)) in response to the received INVITE request (S12). Upon receiving the response, the controller 120 in the image forming apparatus 100 transmits ACK in response to the received response (S13).

The controller 120 then performs a session establishment process of the T.38 session (S14). The controller 120 attempts to establish the T.38 session with the IP address of the response information, transmitted in response to the call connection request, as a destination IP address. If the IP address is changed on the public IP network 400 (for example, if the maintenance apparatus 800 is replaced), the controller 120 is unable to perform a routing operation and fails to establish the T.38 session in the session establishment process. In such a case, the controller 120 retrieves the IP address again by performing operations in S17 through S19. The controller 120 first transmits a BYE request to clear the call to the communication apparatus 900 (S15). The communication apparatus 900 transmits a response in response to the BYE request (S16).

Upon receiving the response to the BYE request, the controller 120 checks a cause for the failure in the facsimile data transmission. If the cause for the failure is attributed to routing, the controller 120 compares the destination IP address of the facsimile data of the response information transmitted in response to the call connection request with the IP address stored on the IP address storage area 131. If the two IP addresses are different from each other, the controller 120 determines that the IP address has been changed on the public IP network 400 for any possibly reason, and then requests the router 200 to modify the setting in accordance with the retrieved IP address (S17). The request is similar to the request in S6 of FIG. 6.

Upon receiving the request, the router 200 modifies the setting information in accordance with the received request, and then transmits to the image forming apparatus 100 a response indicating the modification of the setting information (S18). The controller 120 in the image forming apparatus 100 receives the response, and performs the call connection process again (S19), and then starts transmitting the facsimile data.

If the controller 120 in the image forming apparatus 100 fails to establish the T.38 session, the controller 120 clears the call and updates the setting information on the router 200 using the destination IP address of the facsimile data. Even if the IP address is changed for any possible reason, the controller 120 updates the setting information and performs the facsimile communication.

Modifications

The exemplary embodiment of the present invention has been described. The present invention is not limited to the exemplary embodiment, and may be implemented in a variety of modifications. The modifications of the exemplary embodiment are described below. The modifications may be used alone or in combination.

(1) In the exemplary embodiment, the intranet 300 is used as the first communication network, and the public IP network 400 is used as the second communication network. The first communication network and the second communication network are not limited to those described with the exemplary embodiment. Any multiple communication networks may be used for the first and second communication networks as long as the multiple communication networks are different in system. In accordance with the exemplary embodiment, the public IP network is an NGN network. The public IP network is not limited to the NGN network, and may be any communication network as long as the communication network is based on the IP communication.

(2) In the exemplary embodiment, T.38 protocol is used in the facsimile data transmission. The protocol for the facsimile data transmission is not limited to the T.38 protocol. A different protocol may be used for the facsimile data transmission. In the exemplary embodiment, the facsimile data are transmitted. The communication process is not limited to the facsimile data transmission. For example, IP telephone communication via voice over Internet protocol (VoIP) may be performed. The communication process may be applied to a data communication of another type. In the exemplary embodiment, the controller 120 retrieves the IP address from the SDP information. The IP address may be retrieved in another method. The IP address included in different data may be retrieved. It is sufficient if the controller 120 retrieves the IP address included in the response data transmitted when the call connection process is performed.

Figure 8:
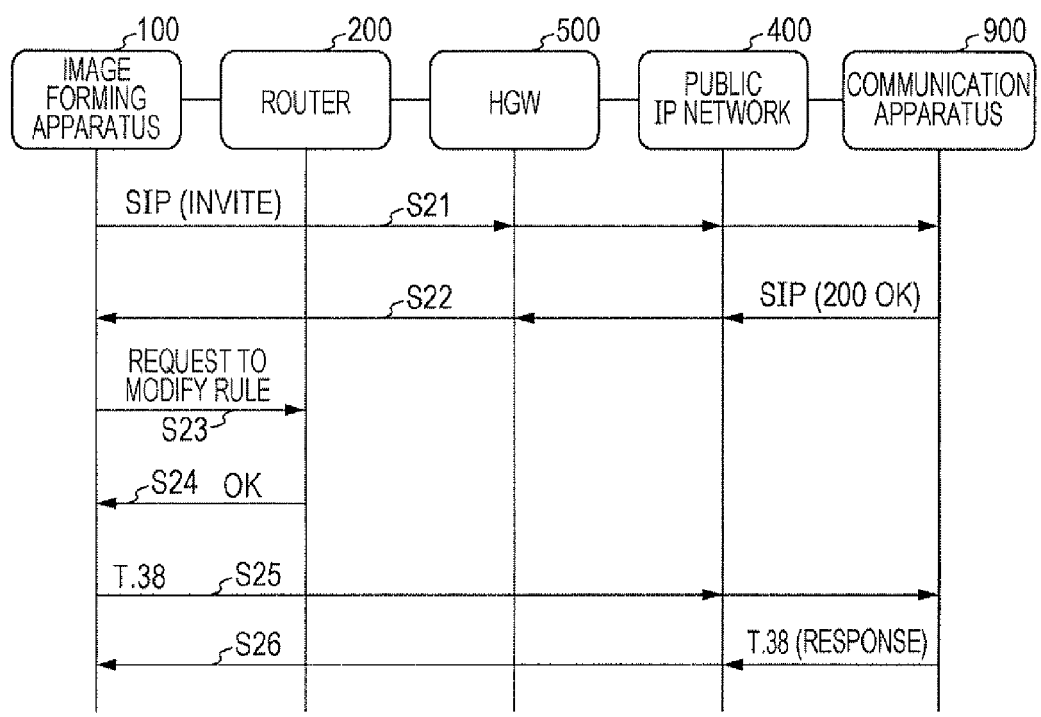
FIG. 8 is a sequence chart illustrating an operation of the communication system.

(3) In the exemplary embodiment, the controller 120 clears the call without starting the TCP session of the facsimile communication if a response to the SIP (INVITE) request is received in the test call connection process. The controller 120 is not limited to this operation. For example, the controller 120 may operate as illustrated in FIG. 8. In the operation of FIG. 8, the controller 120 determines whether the IP address is to be modified each time the facsimile data are transmitted. As illustrated in FIG. 8, the controller 120 transmits the INVITE request to the communication apparatus 900 as a transmission destination (S21), and waits on standby until a SIP response has been received from the communication apparatus 900. Upon receiving the SIP response from the communication apparatus 900 (S22), the controller 120 retrieves an IP address from the SDP information of the received SIP response, and compares the retrieved IP address with the IP address stored on the IP address storage area 131. If the two IP addresses are different from each other, the controller 120 transmits a rule modification request to the router 200 (S23). The transmission operation is identical to the operation in S6 of FIG. 6. If the retrieved IF address matches the IP address stored on the IP address storage area 131, the controller 120 does not transmit the rule modification request.

Upon receiving the rule modification request from the image forming apparatus 100, the router 200 modifies the setting information in accordance with the received request information. The modification process is identical to the process described with reference to the exemplary embodiment, and is not described further. Upon completing the setting process, the router 200 transmits a response to the rule modification request (S24). Upon receiving the response, the controller 120 starts to establish the T.38 session (S25, and S26).

(4) In the exemplary embodiment, the controller 120 stores the IP address retrieved from the SDP information onto the storage area arranged on the memory 130. The storage location of the IP address is not limited to the memory 130. For example, the IP address may be temporarily stored on the RAM.

(5) In the exemplary embodiment, the controller 120 performs the test call connection process if the image forming apparatus 100 is started up, if the application performing the facsimile function is started up, or if the operation and display unit 140 outputs the predetermined signal in response to a user operation. The execution of the test call connection process is not limited those timings, and the test call connection process may be performed at another timing. The controller 120 may perform the test call connection process periodically (once a day, or once a week, for example). When the image forming apparatus 100 performs the facsimile transmission for the first time after the startup thereof, the controller 120 may retrieve the IP address from the SDP information (in the process of FIG. 8).

(6) The program stored on one of the ROM 122 and the memory 130, and the program stored on one of the ROM 222 and the memory 230 may be supplied in a stored state on computer readable recording media. The computer readable recording media include magnetic recording media (a magnetic tape, magnetic disks (such as hard disk drive (HDD), and flexible disk (FD)), optical recording medium (such as an optical disk), magneto-optical recording medium, and a semiconductor memory. The programs may also be downloaded onto the image forming apparatus 100 or the router 200 via a communication network such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication apparatus comprising:
    a first storage unit that stores an Internet protocol (IP) address;
    a call connection unit that connects a call by transmitting a call connection request, via a communication control apparatus connected to a public IP network and selecting the public IP network to transmit incoming data to the public IP network, to a communication apparatus having an IP address and connected to the public IP network, and by receiving, via the communication control apparatus, session description protocol (SDP) information as response information, including IP address information, transmitted in response to the call connection request;
    an IP address retrieval unit that retrieves the IP address included in the response information received by the call connection unit;
    an instructing unit that, if the IP address retrieved by the IP address retrieval unit is different from the IP address stored on the first storage unit, overwrites the IP address stored on the first storage unit with the retrieved IP address, and instructs the communication control apparatus to overwrite an IP address stored on the communication control apparatus with the retrieved IP address; and
    a transmitting unit that transmits facsimile data, via the communication control apparatus, to the IP address provided as a result of overwriting by the instructing unit as a destination address if the facsimile data are to be transmitted to the communication apparatus connected to the public IP network.

2. The communication apparatus according to claim 1, wherein the call connection unit connects the call in response to at least one of an action in which an operation of the communication apparatus is started up, an action in which the transmitting unit transmits the facsimile data, and an action in which an operation unit operated by a user outputs a predetermined signal, and then clears the call without starting a transmission control protocol (TCP) session of facsimile data communication if the response information has been received.

3. The communication apparatus according to claim 1, wherein if the transmitting unit has failed to transmit the facsimile data, the call connection unit transmits a request to clear a call, and receives response information transmitted in response to the request to clear the call, and wherein if the call connection unit determines that a cause for the transmission failure is attributed to a selection of the communication network, the instructing unit instructs the communication control apparatus to overwrite the IP address stored on the communication control apparatus with the IP address included in the response information.

4. The communication apparatus according to claim 1, wherein the public IP network is a next generation network (NGN), and wherein the IP address retrieval unit retrieves a listening IP address in T.38 protocol included in the SDP information included in the response information.

5. The communication apparatus according to claim 2, wherein the public IP network is a next generation network (NGN), and wherein the IP address retrieval unit retrieves a listening IP address in T.38 protocol included in the SDP information included in the response information.

6. The communication apparatus according to claim 1, wherein the call connection unit connects the call using a bandwidth rated for a communication fee that satisfies a predetermined condition.

7. The communication apparatus according to claim 2, wherein the call connection unit connects the call using a bandwidth rated for a communication fee that satisfies a predetermined condition.

8. The communication apparatus according to claim 3, wherein the call connection unit connects the call using a bandwidth rated for a communication fee that satisfies a predetermined condition.

9. A communication control apparatus comprising:
    an access setting information storage unit that stores access setting information indicating an Internet protocol (IP) address that authorizes access from a public IP network to a first communication network;
    a communication network setting information storage unit that stores communication network setting information indicating an IP address according to which one of the first communication network and the public IP network is selected to transmit incoming data therethrough;

a receiving unit that receives from a communication apparatus a modification instruction to modify the access setting information and the communication network setting information;

a setting information modifier unit that modifies the access setting information stored on the access setting information storage unit and the communication network setting information stored on the communication network setting information storage unit in accordance with the modification instruction received by the receiving unit;

an access control unit that controls access to permit an access from the IP address indicated by the access setting information stored on the access setting information storage unit to the first communication network; and a data transmitting unit that transmits, via the public IP network, data including the IP address indicated by the communication network setting information stored on the communication network setting information storage unit.

10. A communication system comprising a communication apparatus, and a communication control apparatus connected to the communication apparatus, a first communication network, and a public Internet protocol (IP) network, wherein the communication apparatus includes:

a first storage unit that stores an IP address;

a call connection unit that connects a call by transmitting via the communication control apparatus a call connection request to an apparatus connected to a public IP network, and by receiving, via the communication control apparatus, response information transmitted in response to the call connection request;

an IP address retrieval unit that retrieves an IP address included in the response information received by the call connection unit;

an instructing unit that, if the IP address retrieved by the IP address retrieval unit is different from the IP address stored on the first storage unit, overwrites the IP address stored on the first storage unit with the retrieved IP address, and instructs the communication control apparatus to overwrite an IP address stored on a second storage unit with the retrieved IP address; and a transmitting unit that transmits facsimile data to the IP address stored on the first storage unit as a destination address if the facsimile data are to be transmitted to the communication apparatus connected to the public IP network, and wherein the communication control apparatus includes:

the second storage unit including:

an access setting information storage unit that stores access setting information indicating an IP address that authorizes access from the public IP network to the first communication network; and a communication network setting information storage unit that stores communication information setting information indicating an IP address according to which one of the first communication network and the public IP network is selected to transmit incoming data therethrough;

a receiving unit that receives from the communication apparatus a modification instruction to modify the access setting information and the communication network setting information;

a setting information modifier unit that modifies the access setting information stored on the access setting information storage unit and the communication network setting information stored on the communication network setting information storage unit in accordance with the modification instruction received by the receiving unit;

an access control unit that controls access to permit an access from the IP address indicated by the access setting information stored on the access setting information storage unit to the first communication network; and a communication network selection unit that transmits data via the public IP network if an IP address of the data is the IP address indicated by the communication network setting information stored on the communication network setting information storage, and transmits the data via the first communication network if the IP address of the data is not the IP address indicated by the communication network setting information.

* * * * *